INVENTORS:
JOHN A. HEDGE
KENNETH A. SCOTT

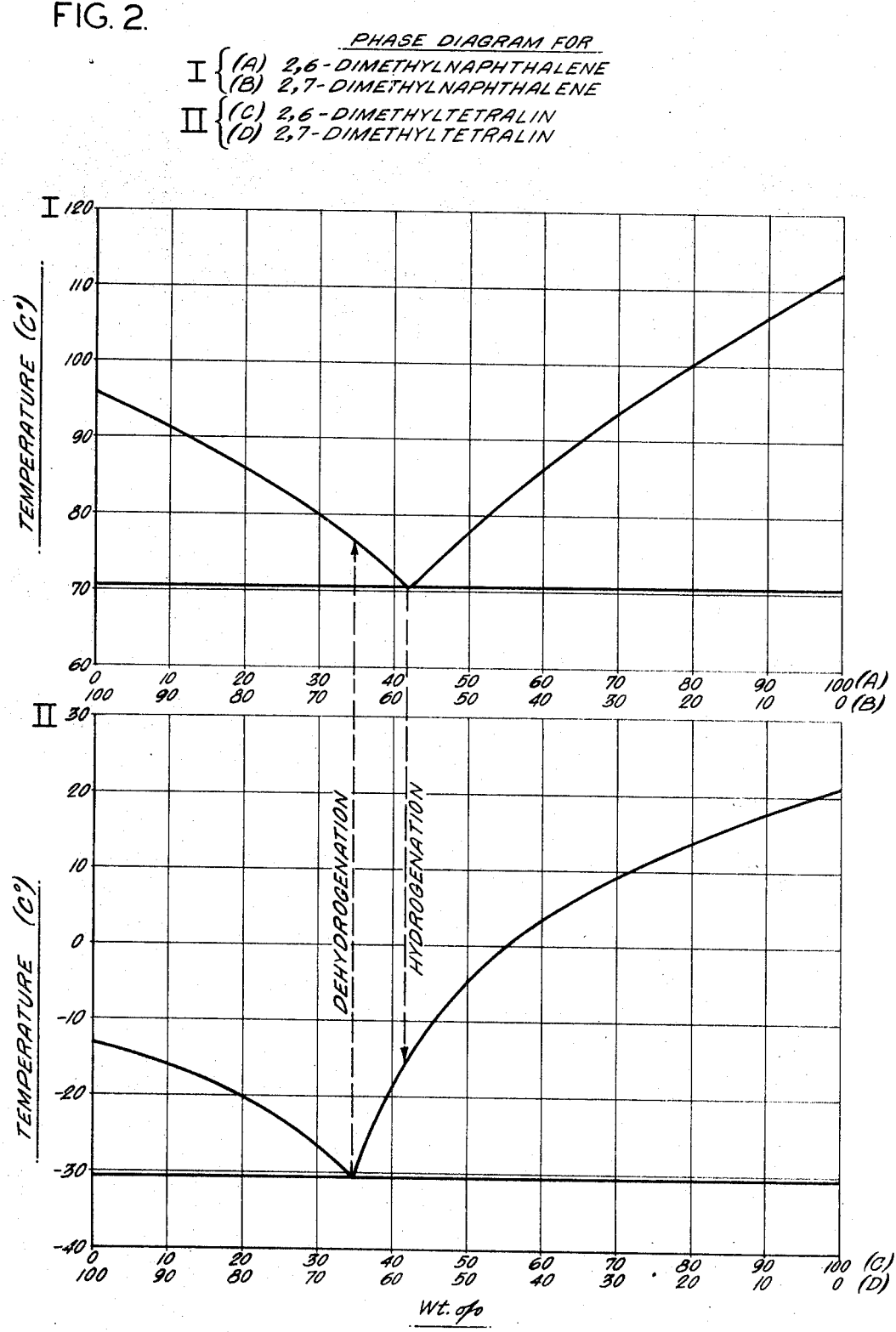

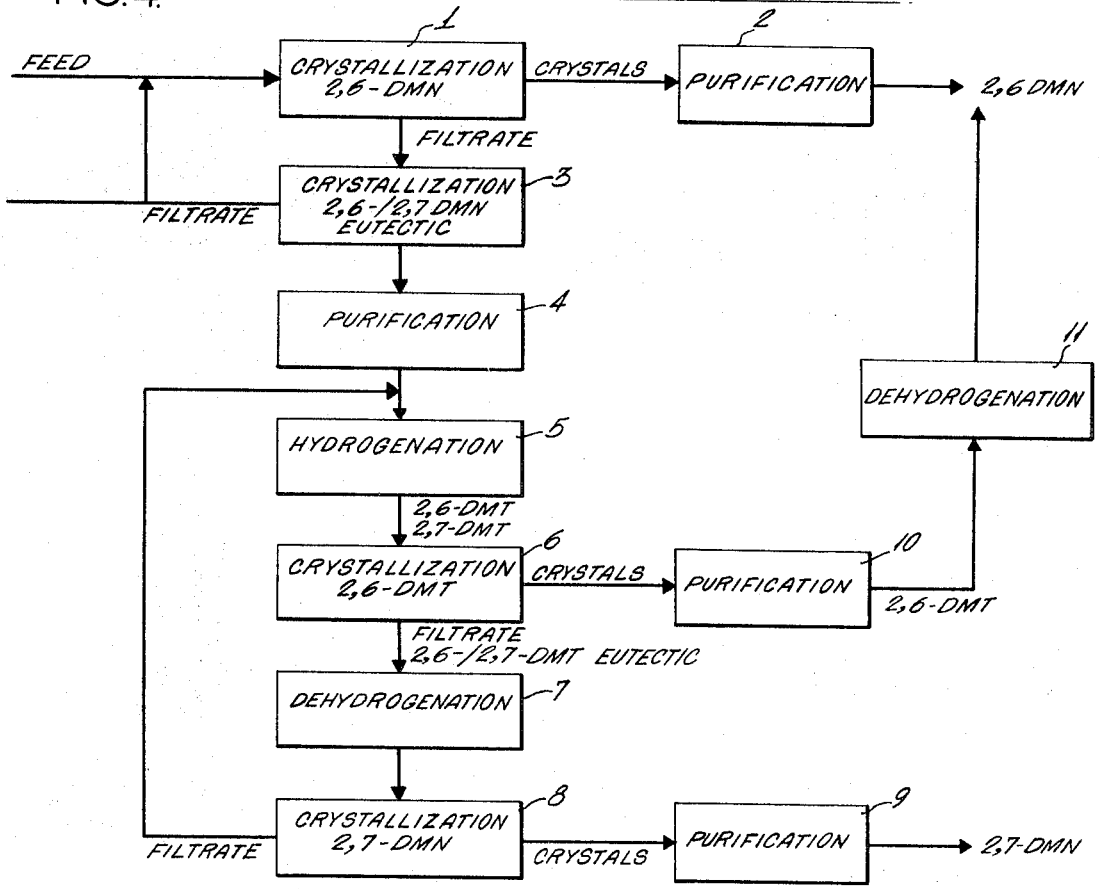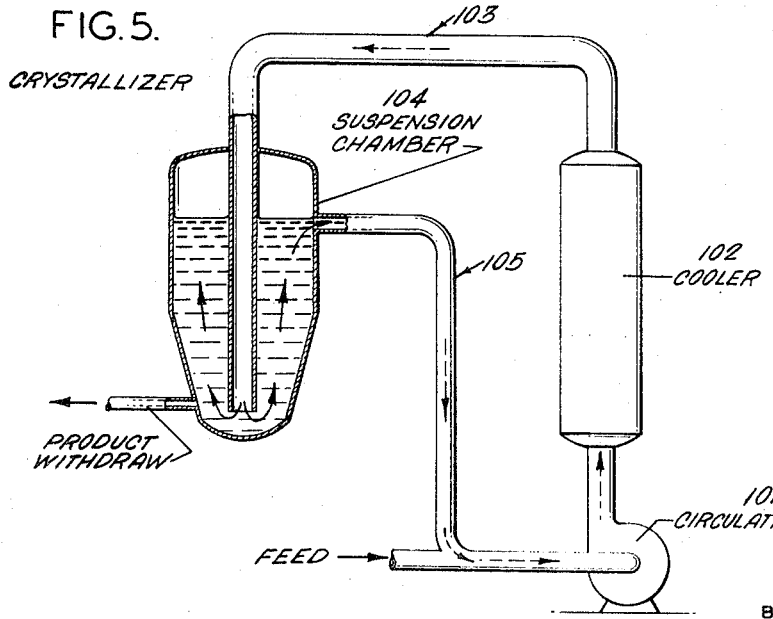

United States Patent Office 3,594,436
Patented July 20, 1971

3,594,436
SEPARATION OF 2,6- AND 2,7-DMN EUTECTIC VIA 2,6-DIMETHYLTETRAHYDRONAPHTHALENE CRYSTALLIZATION
John A. Hedge, Devon, Wilmington, Del., and Kenneth A. Scott, Swarthmore, Pa., assignors to Sun Oil Company, Philadelphia, Pa.
Filed Feb. 3, 1969, Ser. No. 796,078
Int. Cl. C07c 7/14, 15/24
U.S. Cl. 260—674N   10 Claims

ABSTRACT OF THE DISCLOSURE

Essentially all of the 2,6-dimethylnaphthalene (DMN) contained in the 2,6-/2,7-dimethylnaphthalene eutectic mixture can be recovered by hydrogenating the eutectic mixture to produce a mixture of 2,6- and 2,7-dimethyltetralin (DMT). The 2,6/2,7-DMT also forms a eutectic, however, it is at a different ratio than the 2,6/2,7-DMN. The shift is in favor of greater 2,7-DMT in the eutectic thus there is free 2,6-DMT that can be recovered from this mixture. 2,6-DMT can be recovered in high yields and high purity by carefully controlling the temperature of crystallization at the lowest temperature determined from FIG. 3 at which all of the 2,6-/2,7-DMT eutectic is soluble in the liquids present. For example, a hydrogenated 2,6-/2,7-DMN eutectic feed containing

|  | Wt. percent |
|---|---|
| 2,6-DMT | 30 |
| 2,7-DMT | 30 |
| Other liquid aromatics | 40 | will have a eutectic of 2,6-/2,7-DMT in the weight ratio of .538. Thus, the eutectic represents 46.2% of the incoming feed. To use FIG. 3, the weight percent of eutectic is calculated on total feed excluding the free 2,6-DMT in this case the weight percent of eutectic to be dissolved is calculated to be 53.6 wt. percent. From FIG. 3, 53.6 wt. percent eutectic is soluble at −51° C. The temperature of crystallization should be no less than −51° C. (±2° C.) to avoid crystallization of the 2,6-/2,7-DMT eutectic and no more than −51° C. (± 2° C.) to avoid dissolving free 2,6-DMT.

---

This invention relates to a procedure for recovering 2,6- and 2,7-dimethylnaphthalene (DMN) from a eutectic mixture of 2,6- and 2,7-dimethylnaphthalene.

The recovered isomers are useful for various purposes as known in the art. For example, the 2,6-DMN can be partially oxidized to produce dicarboxylic acid or other oxidation products. The diacid is particularly useful for the preparation of polyesters by the reaction with aliphatic diols such as, ethylene glycol. The resulting polyesters are useful for the preparation of fibers, coatings, and the like.

The usual manner of recovery of 2,6-DMN is from a hydrocarbon feed stock such as that derived from petroleum, coal tar, synthetic tar sand crudes, shale oil, and the like. The feed stock is preferably one containing a substantial amount of dimethylnaphthalenes, in particular, the 2,6-isomer. Typically, the feed stock contains at least 80%, preferably at least 90%, of aromatic hydrocarbons. The content of the 2,6-isomer in the feed stock is typically in the range of from 5 to 40 wt. percent, preferably 10 to 30 wt. percent.

Examples of suitable feed stocks are various highly aromatic fractions produced in petroleum refining and conversion processes. Higher boiling aromatic fractions produced in reforming of petroleum naphtha to produce high octane gasoline, are examples of such feed stocks. Aromatic fractions produced by the thermal cracking of catalytically reformed gasoline; aromatic fractions produced by the catalytic cracking of thermally reformed naphtha; and aromatic concentrates obtained from catalytic gas oil produced in catalytic cracking of petroleum; are additional examples of suitable feed stocks. The latter concentrates can be prepared, for example, by solvent extraction, e.g., with furfural, by selective adsorption, or by other known processes.

The usual procedure for recovering the free 2,6-DMN from the aromatic hydrocarbon feed is to cool the feed to precipitate a solid material containing one or more of the isomers, e.g., the 2,6-DMN in a concentrated but still crude form. The 2,6-DMN then is recrystallized, for example, from methanol. This procedure is repeated until the desired purity is reached.

In order to concentrate a given isomer or isomers in the feed stock, it is usually desirable to obtain a relatively narrow boiling distillate fraction for use as the feed stock for the crystallization in the case of 2,6-dimethylnaphthalene, a distillate fraction having boiling range of approximately 490 to 515° F., more preferably 495 to 510° F. or some narrower boiling range within the range of 490 to 515° F., is preferred.

FIG. 2 is a binary phase diagram of (I) 2,6-/2,7-DMN eutectic and (II) 2,6-/2,7-DMT and the relationship between the two in regard to hydrogenation and dehydrogenation.

FIG. 4 is a flow diagram for the recovery of 2,6- and 2,7-DMN.

FIG. 5 is a schematic representation of the crystallizer.

Figure 1:
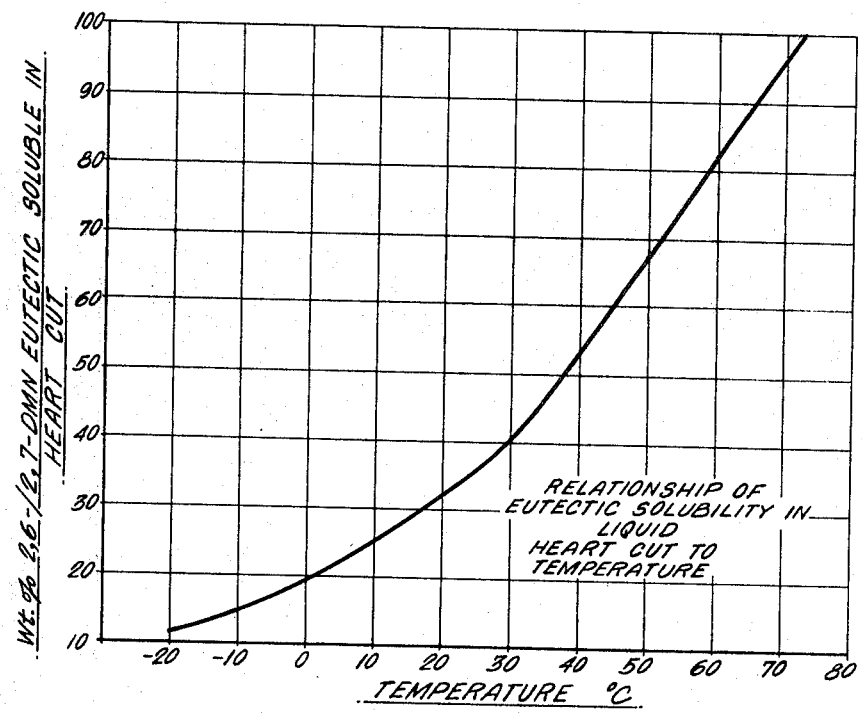
FIG. 1 is a graph showing the weight percent of 2,6-/2,7-DMN eutectic soluble in the liquid portion of the feed to the crystallization at a given temperature.

The usual procedure for crystallization has been to heat the feed stock to a sufficiently high temperature to obtain solution of normally solid components in the liquid phase. In the case of fractions boiling in the range of 495 to 510° F. and containing 10 to 30 wt. percent of 2,6-dimethylnaphthalene the fraction at room temperature is a slurry containing solid components as well as liquid components. The extent of heating necessary to obtain solution of such solid components may readily be determined by a person skilled in the art and is usually in the range of 80 to 120° F. The temperature varies depending upon the starting material, and in some cases no heating is required to obtain complete solution.

In the past the usual procedure was to cool the feed stock to crystallize solid material constituting a crude concentrate of the isomer or isomers to be recovered. Usually the temperature of crystallization was in the range from −50° C. to 50° C.

When the 2,6-DMN is isolated from a mother liquor also containing 2,7-DMN there will be a 2,6-/2,7-DMN eutectic formed. It has been determined that the eutectic forms with the weight ratio of 2,6-; 2,6-DMN being .725:1. The 2,6-DMN or 2,7-DMN that can be recovered from such mixtures, according to the present invention, is that in excess of the 2,6-/2,7-eutectic mixture.

In the past, little regard has been paid to the presence of this eutectic in the crystallizations. Usually the eutectic has been one of the major impurities which was the subject of extensive post crystallization purifications such as, recrystallization from methanol.

In commonly assigned U.S. patent application of Skarada and Hedge, Ser. No. 753,176, filed Aug. 16, 1968, it was found that by carrying out the crystallization of 2,6-MMN at specific temperatures determined on the amount of 2,6-/2,7-DMN eutectic present, extremely high yields of high purity 2,6-DMN could be obtained. Briefly stated Skarada and Hedge found an improvement in the process of recovering 2,6-dimethylnaphthalene from a feed containing 2,6-dimethylnaphthalene and 2,7-dimethylnaphthalene by crystallizing the 2,6-dimethylnaphthalene from said feed at a temperature in the range of −50 to 71° C. wherein the improvement comprises carrying out said crystallization at the lowest temperature determined from FIG. 1 at which the 2,6-/2,7-dimethylnaphthalene eutectic mixture is soluble in the liquid present.

The temperature of crystallization is determined by the amount of 2,7-DMN present. This is so because it has been determined that the 2,7-DMN combines with the 2,6-DMN in the eutectic mixture in the weight ratio of 2,6-/2,6-DMN of .725:1. Thus, in order for any 2,6-DMN to be recovered from a feed it must be present in a weight ratio of greater than .725:1 to 2,7-DMN. Close temperature control in the crystallization process of the present invention is important.

The optimum crystallization temperature for a particular feed stock is selected, based on the amount of 2,6-/2,7-DMN eutectic mixture present. Because of the equipment and human limitations, it would be impossible to operate at exactly the temperature which will give optimum results and for that reason and the purposes of the present invention and claims, it is to be understood that the temperature determined from FIG. 1 is equivalent at ±2° C. If the temperature of crystallization is appreciably lower than that determined from FIG. 1, then 2,6-/2,7-DMN eutectic will be cocrystallized with the 2,6-DMN thus resulting in the inadequacies of the prior art. If the crystallization temperature is appreciably higher than that determined from FIG. 1 then some of the 2,6-DMN will be solubilized and lower yields will result. The determination of 2,6-/2,7-DMN eutectic present is best achieved by analysis of the feed for the 2,7-DMN and 2,6-DMN present and calculation of the weight percent of eutectic based on 2,7-DMN. FIG. 1, however, is not based on the feed stream concentration, but is more meaningfully related to solubility of the 2,6-/2,7-DMN eutectic at a particular temperature in the liquids present at that temperature, i.e., the mother liquor and the 2,6-/2,7-DMN eutectic, but excluding the crystalline 2,6-DMN. For example, 100 pounds of feed contained:

25# 2,6-DMN
28# 2,7-DMN
47# other liquid aromatics
  boiling between 495–510° F.

The eutectic contained 42 wt. percent 2,6-DMN and 58 wt. percent 2,7-DMN i.e., weight ratio of .725:1. Therefore, the total eutectic represented 48.3% of the incoming feed. The optimum temperature for purity and yield is that at which 48.3% of eutectic will be soluble in the 47 pounds of other liquid aromatics. Thus, the weight percent of eutectic to be dissolved is recalculated based on the liquid material remaining at the temperature of crystallization by:

$$\frac{48.3}{48.3+47} \times 100 = 50.7 \text{ wt. percent}$$

From FIG. 1, 50.7% eutectic is soluble at 37° C. Therefore, the temperature must be at least 37° C. (±2° C.) in order to avoid crystallization of 2,6-/2,7-DMN eutectic and should be no more than 37° C. (±2° C.) if the highest yield of 2,6-DMN is to be obtained.

In the past the eutectic which is extremely difficult to break was considered of little value. It was usually returned to the feed stream from which the 2,6-/2,7-DMN was derived. However, in the ordinary feed stream from which the 2,6-/2,7-DMN are derived most of the 2,6-DMN is tied up in the eutectic. This 2,6-DMN was for the most part not recoverable.

The present invention provides a means of recovering 2,6-DMN from the eutectic mixture. This is achieved by converting the 2,6-/2,7-DMN eutectic to a 2,6-/2,7-dimethyltetralin (DMT) mixture by hydrogenating the 2,6-/2,7-DMN eutectic mixture. The eutectic mixture of 2,6-DMT to 2,7-DMT forms in the weight ratio of .538:1 or stated otherwise the DMT eutectic is composed of 35 wt. percent 2,6-DMT and 65 wt. percent 2,7-DMT. Referring now to FIG. 2, it can be seen that there is recoverable 2,6-DMT after the 2,6-/2,7-DMN eutectic is converted to 2,6-/2,7-DMT.

Figure 3:
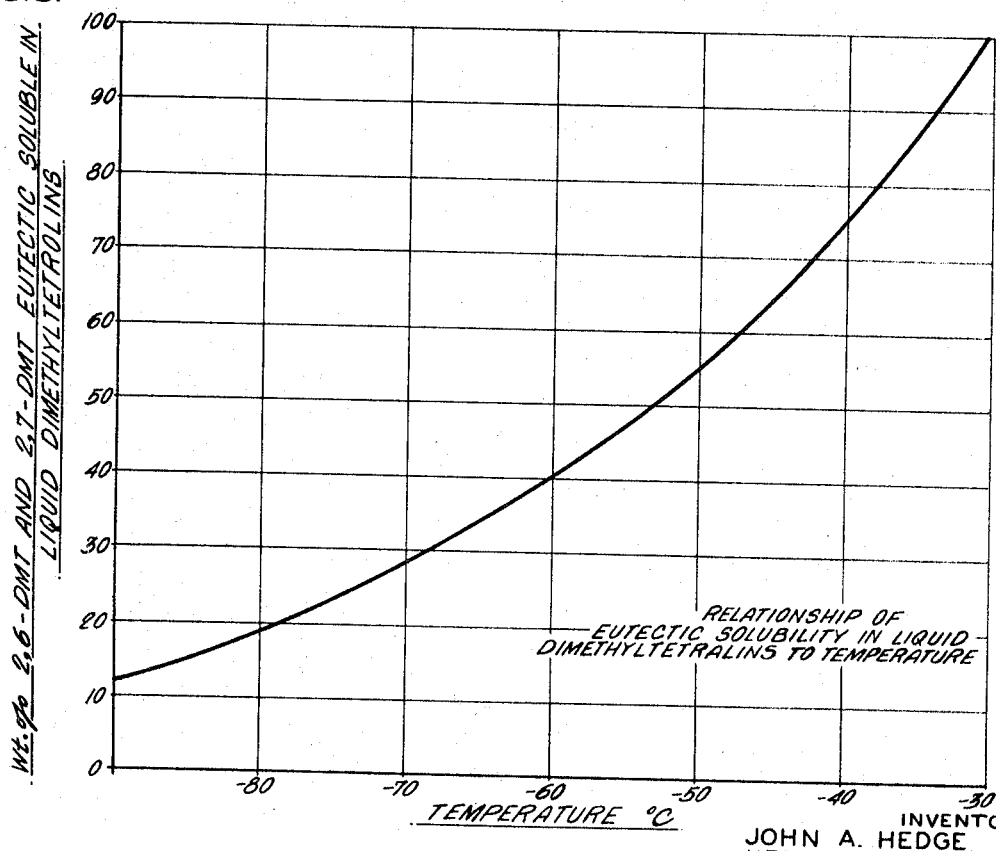
FIG. 3 is a graph showing the weight percent of 2,6-/2,7-DMT eutectic soluble in the liquid portion of the feed stock to the crystallization at a given temperature.

Briefly stated the present invention is a process for recovering 2,6-dimethyltetralin from a feed containing 2,6-dimethyltetralin and 2,7-dimethyltetralin comprising crystallizing the 2,6-dimethyltetralin at a temperature in the range of −80 to −30° C. said temperature being the lowest temperature determined from FIG. 3 at which the 2,6-2,7-dimethyltetralin eutectic mixture is soluble in the liquid present.

One particular embodiment of the present invention is a process for recovering 2,6-dimethylnaphthalene from a eutectic mixture of 2,6-/2,7-dimethylnaphthalene comprising (a) hydrogenating the 2,6-/2,7-dimethylnaphthalene eutectic mixture in the presence of a hydrogenation catalyst, (b) recovering a mixture containing 2,6-dimethyltetralin and 2,7-dimethyltetralin, (c) crystallizing the 2,6-dimethyltetralin from the mixture of step (b) at a temperature in the range of −80 to −30° C. said temperature being the lowest temperature determined from FIG. 3 at which the 2,6-/27-dimethyltetralin eutectic mixture is soluble in the liquid present, (d) recovering 2,6-dimethyltetralin (e) dehydrogenating the 2,6-dimethyltetralin in the presence of a dehydrogenation catalyst and (f) recovering 2,6-dimethylnaphthalene.

The optimum crystallization temperature for a particular feed stock is selected based on the amount of 2,6-/2,7-DMT eutectic mixture present. The use of crystallization temperatures appreciably lower than that determined from FIG. 3 will result in the cocrystallization of the 2,6-/2,7-DMT eutectic with the 2,6-DMT. If the crystallization is carried out at an appreciably higher temperature than that determined from FIG. 3 then some of the 2,6-DMT will be solubilized and lower yields will result. However, because of equipment and human limitations for the purposes of the present invention and claims, it is to be understood that the temperature determined from FIG. 3 is equivalent at ±2° C.

The optimum crystallization temperature for a particular feed stock is selected based on the amount of 2,6-/2,7-DMT eutectic mixture present. This is best done by analysis of the feed for the 2,7- and 2,6-DMT present, by conventional and well known methods and calculation of the weight percent of eutectic based on 2,7-DMT. FIG. 3, however, as in the case of DMN is not based on the feed stream concentration but is more meaningfully related to solubility of the 2,6-/2,7-DMT eutectic at a particular temperature in the liquids present at that temperature, i.e., the feed to the crystallization less than the crystalline 2,6-DMT at that temperature.

For example, 100 pounds of feed contains

30# 2,6-DMT
30# 2,7-DMT
40# other liquid
aromatics boiling between 495–510° F.

The eutectic contained 35 wt. percent 2,6-DMT and 65 we. percent 2,7-DMT, i.e., weight ratio of .538:1. Therefore, the total eutectic represents 46.2% of the incoming feed. The optimum temperature for purity and yield is that at which 46.2% of eutectic will be soluble in the 40 pounds of other liquid aromatics. Thus, the weight percent of eutectic to be dissolved is recalculated based on the liquid material remaining at the temperature of crystalllization by $$\frac{46.2}{46.2+40} \times 100 = 53.6 \text{ wt. percent}$$

from FIG. 3, 53.6% eutectic is soluble at −51° C. Therefore, the temperature must be at least −51° C. (±2° C.) if the highest yield of 2,6-DMT is to be obtained.

In the embodiment wherein the 2,6-/2,7-DMT mixture is recovered from a relatively pure hydrogenated 2,6-/2,7-DMN eutectic mixture there will be essentially a 100% conversion to the DMT thus the limiting factor on the crystallization temperature will be the crystallization temperature of the 2,6-/2,7-DMT eutectic mixture which is −30° C. In order to avoid crystallizing the DMT eutectic the crystallization temperature must be above −30° C. Of course, any crystallization temperature substantially above −30° C. will result in loss of recoverable free 2,6-DMT. This situation is contrasted with that present in a process disclosed in commonly assigned U.S. patent application Ser. No. 779,827, filed Nov. 29, 1968. Separation of 2,6-DMN and 2,7-DMN Eutectic Via Trans 2,6-Dimethyldecalin Crystallization filed Nov. 29, 1968. In the latter process the hydrogenation is carried out to produce dimethyldecalins. In the dimethyldecalin process the hydrogenation results in no more than 50% of the predominant and highest melting 2,6-/2,7-trans-syn-syn-dimethyldecalin (TSS-DMD) isomers thus requiring 2,6-TSS-DMD crystallization temperatures, lower than the crystallization temperature of the pure 2,6-/2,7-TSS-DMD eutectic mixture.

After the 2,6-DMT is recovered it is dehydrogenated to produce 2,6-DMN. The remaining 2,6-/2,7-DMT eutectic can be disposed or in a further embodiment of this invention the 2,6-/2,7-DMT eutectic mixture is dehydrogenated to 2,6-/2,7-DMN. Referring again to FIG. 2 it can be seen that this will yield a 2,6-/2,7-DMN mixture in which there is an excess of 2,7-DMN which can be recovered to the point of the eutectic. The 2,6-/2,7-DMN eutectic can then be hydrogenated and the process repeated to extinction of the 2,6- and 2,7-DMN present.

It should be mentioned that in this regard the previously mentioned dimethyldecalin process gives a more favorable shift in the 2,6-/2,7-TSS-DMD eutectic thus allowing a higher percentage of 2,6-TSS-DMD to be recovered but because of the low conversion to the TSS-DMD isomers in the hydrogenation, i.e., only 50% as compared to essentially 100% conversion to the 2,6-/2,7-DMT isomers, the recovery of 2,6-DMN per cycle in both processes is essentially the same.

This can be seen more clearly by reference to FIG. 4 which is a flow diagram for the recovery of 2,6- and 2,7-dimethylnaphthalene. The feed stock, for example, catalytic gas oil containing an excess of 2,6-DMN over the 2,6-/2,7-DMN eutectic is (1) crystallized to recover the free 2,6-DMN. The recovered 2,6-DMN is (2) purified to give 98+% pure material. The filtrate from the crystallization is then (3) crystallized to recover most of the eutectic 2,6-/2,7-DMN. The crystallized 2,6-/2,7-DMN eutectic is then (4) purified and the filtrate discarded or recycled in the feed to (1) crystallization. The purified 2,6-/2,7-DMN eutectic is then (5) hydrogenated to yield a mixture including 2,6- and 2,7-DMT. This mixture is then (6) crystallized to recover free 2,6-DMT which is (10) purified and (11) dehydrogenated to give 98+% pure 2,6-DMN. The filtrate from (6) crystallization is then (7) dehydrogenated. The dehydrogenated mixture is rich in 2,7-DMN. This mixture is now (8) crystallized to recover free 2,7-DMN which is (9) purified to give 98+% pure material. The filtrate from (8) crystallization is then essentially 2,6-/2,7-DMN eutectic and can be returned to (5) hydrogenation.

When 2,7-DMN is present in excess of the 2,6-/2,7-DMN eutectic it is recovered in the same manner as previously described for 2,6-DMN by calculating the amount of eutectic present based on liquids, i.e., excluding free 2,7-DMN then determining the lowest temperature from FIG. 1 at which the eutectic will be soluble in the liquid present.

The flow diagram depicts the most advantageous application of the present invention. It should be recognized however that the feed to (5) hydrogenation need not be a eutectic mixture of 2,6-/2,7-DMN but can contain an excess of either isomer. There is no advantage, however, to hydrogenating a mixture that contains an excess of one of the isomers since the isomer in excess can be easily recovered and purified whereas if the isomer in excess is not removed prior to hydrogenation the hydrogenation must handle larger quantities which is an economically unattractive alternative.

The 2,6-/2,7-DMN eutectic is hydrogenated with conventional catalyst and procedures, for example, the Group VIII metals of the Periodic Table, Raney nickel and the like, particularly the noble metals such as platinum, palladium, rhodium, ruthenium or iridium. Most preferred is palladium. The metals are preferably supported. Suitable supports include silica, alumina, carbon, predominately siliceous materials such as diatomaceous earth, kieselgulur, fuller's earth, etc., or clays such as bentonite, montmorillonite, etc.

The hydrogenations are carried at temperatures in the range of 50 to 150° C. The reaction is generally at pressures in the range of 500 to 8,000 p.s.i. Under these conditions the hydrogenations generally taken from 0.5 to 12 hours and results in essentially 100% yields of dimethyltetralins. Temperatures above about 150° C. will result in increasing yields of dimethyldecalins.

The dehydrogenation of the 2,6-/2,7-TSS-DMD eutectic is also carried out conventionally. A suitable dehydrogenation catalyst is platinum on alumina, preferably halide free. The temperature is in the range of 200 to 550° C. preferably 300 to 350° C. and pressure is at 1 to 30 atmospheres. A number of suitable hydrogenation and dehydrogenation catalysts and procedures are shown in the literature, for example, Berkman et al. "Catalysis," Reinhold, Pub. Co., N.Y., 1940, in particular, pages 809–918.

The crystallizations may be carried out in a Struthers-Wells Krystal contact cooling crystallizer. This apparatus allows a one stage crystallization and a specific temperature of operation. FIG. 5 shows the operation of the crystallizer. The feed comes into the system and is rapidly passed through cooler 102, through conduit 103 into suspension chamber 104 and, hence through 105 back to circulation pump 101. Crystalline material is withdrawn from the suspension chamber and usually further purified.

The circulation rate in the crystallizer is a controlling factor in the degree of supersaturation which in turn is the driving force for crystallization. Also, the high circulation rates permit the cooler to operate with a low temperature difference (T) between coolant and process feed and practically eliminates fouling of the heat transfer surfaces.

The temperature of the feed is maintained at 35–50° C., in the case of the naphthalenes and −30 to 35° C. preferably up to 25° C. for the tetralins to prevent crystallization of the feed before it enters the crystallizer. This warm feed enters the crystallizer in the crystallizer circulation line and becomes mixed with a large volume of circulating crystal slurry. The resulting mixture remains practically at crystallization temperature. This mixture passes through the cooler where the heat of crystallization and sensible heat of the feed are removed and the solution becomes supersaturated. The supersaturation is released and the crystallization occurs when the solution enters the suspension chamber of the crystallizer. The crystallization period is usually 2 to 7 hours, although satisfactory results can be obtained with other crystallization periods.

The crystallizations may also be carried out in a scraped cooling crystallizer. A scraped surface apparatus allows much higher mean temperature difference (T) between coolant and process feed without fouling or plugging, thus, the amount of heat transfer area required is reduced.

EXAMPLE 1

Crystallization of 2,6-DMN

A catalytic gas oil distillate fraction boiling in the range of 495 to 510° F. and prepared from a desulfurized aromatic extract from a naphthalene operation had the following analysis

| | Wt. percent |
|---|---|
| 2,6-DMN | 19.4 |
| 2,7-DMN | 18.4 |
| Other-DMN's | 45.8 |
| Non-DMN's | 16.4 |

The wt. percent of 2,6-/2,7-DMN eutectic based on liquid materials in which the eutectic is to be solubilized is 33.8 wt. percent. Referring to FIG. 1, the temperature of crystallization was determined to be 22° C. 6.1 weight percent of free 2,6-DMN was recovered. This material was filtered in a basket centrifuge and the crystalline material recovered and repulped with methanol at 24–27° C. then centrifuged and heated to 110° C. to recover methanol. The final product was

| | Wt. percent |
|---|---|
| 2,6-DMN | 98.0 |
| 2,7-DMN | 2.0 |

EXAMPLE 2

Preparation of 2,6-/2,7-DMN eutectic mixture

The filtrate from Example 1 contained a eutectic mixture of 2,6- and 2,7-DMN, i.e., 14.2 wt. percent 2,6-DMN and 19.6 wt. percent 2,7-DMN. This solution was crystallized at −18° C. Referring to FIG. 1 it can be seen that only about 12% of the eutectic 2,6-/2,7-DMN is soluble. The crystals were centrifuged to remove liquids. The recovered crystalline material was repulped with methanol in the ratio of 3 parts of methanol per part of wet crystals. The crystals were centrifuged and heated to 71° C. to remove methanol. The material was essentially pure eutectic 2,6-/2,7-DMN.

EXAMPLE 3

Hydrogenation of 2,6-/2,7-DMN eutectic mixture

Crystalline material from Example 2 was hydrogenated batchwise over 5 wt. percent of 5% Pd on carbon catalyst at 90° C. and 1,500 p.s.i. for 1 hour. The conversion to dimethyltetralins was essentially 100%. The conversion to 2,6 and 2,7-dimethyltetralins was 100% as shown by gas chromatography. The solution contained

| | Wt. percent |
|---|---|
| 2,6-DMT | 42 |
| 2,7-DMT | 58 |

EXAMPLE 4

Crystallization of 2,6-DMT

The solution from Example 3 contained 100 wt. percent of 2,6-/2,7-DMT eutectic based on liquid materials in which the eutectic mixture is to be solubilized. Referring to FIG. 3, it can be seen that the temperature of crystallization must be −30° C. 10.8 weight percent based on the charge to the crystallizer was recovered by centrifuging and repulping the crystals with methanol. The repulped crystals were heated to 22° C. to remove methanol. Essentially pure 2,6-DMT resulted.

EXAMPLE 5

Dehydrogenation of 2,6-TSS-DMD

The 2,6-DMT from Example 4 was dehydrogenated by passing the vaporized sample over Houdry halide-free platinum on alumina catalyst at 350° C. Small amounts of non-dehydrogenated or partially dehydrogenated material were distilled off for recycle. The higher boiling 2,6-DMN was obtained in 98+% purity.

EXAMPLE 6

Dehydrogenation of 2,6-/2,7-DMN eutectic and recovery of 2,7-DMN

The filtrate from Example 4 contained 35% 2,6-dimethyltetralin and 65% 2,7-dimethyltetralin. Dehydrogenation and purification of this filtrate as in Example 5 yielded 35% 2,6-DMN and 65% 2,7-DMN.

This mixture was heated above 75° C. and cooled slowly to precipitate 2,7-DMN. A minimum temperature of 71° C. during precipitation and filtration is required to prevent precipitation of the eutectic mixture. The crude 2,7-DMN precipitate was purified by recrystallization from methanol, yielding 2,7-DMN of 98+% purity.

The eutectic filtrate is then ready for a second cycle of the separation process.

The invention claimed is:

1. A process for recovering 2,6-di-methyltetrahydronaphthalene from a feed containing 2,6-di-methyltetrahydronaphthalene and 2,7-dimethyltetrahydronaphthalene comprising crystallizing the 2,6-di-methyltetrahydronaphthalene at a temperature in the range of −80 to −30° C. said temperature being the lowest temperature determined from FIG. 3 at which the 2,6-di-methyltetrahydronaphthalene eutectic mixture is soluble in the liquid present.

2. The process according to claim 1 wherein the feed is at a temperature of −30° C. to 35° C. prior to crystallization.

3. A process for recovering 2,6-dimethylnaphthalene from a eutectic mixture of 2,6-/2,7-dimethylnaphthalene comprising
    (a) hydrogenating the 2,6-/2,7 - dimethylnaphthalene eutectic mixture in the presence of a hydrogenation catalyst to form a mixture containing essentially 2,6-di-methyltetrahydronaphthalene, and 2,7-dimethyltetrahydronaphthalene,
    (b) recovering the mixture containing 2,6-di-methyltetrahydronaphthalene and 2,7 - dimethyltetrahydronaphthalene.
    (c) crystallizing the 2,6-di-methyltetrahydronaphthalene from the mixture of (b) at a temperature in the range of −80 to −30° C. said temperature being the lowest temperature determined from FIG. 3 at which the 2,6-/2,7-dimethyltetrahydronaphthalene eutectic mixture is soluble in the liquids present,
    (d) recovering 2,6-di-methyltetrahydronaphthalene,
    (e) dehydrogenating the 2,6-di-methyltetrahydronaphthalene in the presence of a dehydrogenation catalyst and
    (f) recovering 2,6-dimethylnaphthalene.

4. The process according to claim 3 wherein (a) the hydrogenation is carried out in the presence of a hydrogenation catalyst of platinum, palladium, rhodium, ruthenium or iridium.

5. The process according to claim 4 wherein the catalyst is platinum or palladium.

6. The process according to claim 5 wherein the catalyst is palladium.

7. The process according to claim 3 wherein the mixture of (b) is at temperature of about −30° C. to 35° C. prior to (c) crystallization.

8. The process according to claim 3 wherein the (e) dehydrogenation catalyst is platinum.

9. The process according to claim 8 wherein the catalyst is platinum on halide-free alumina support.

10. The process according to claim 3 wherein
    (g) an eutectic mixture of 2,6-/2,7-dimethyltetrahydronaphthalene is recovered in the liquids in step (c),
    (h) said eutectic dimethyltetrahydronaphthalene mixture is dehydrogenated in the presence of a dehydrogenation catalyst,
    (i) a mixture containing 2,6- and 2,7-dimethylnaphthalene is recovered and (j) 2,7-dimethylnaphthalene is crystallized from said mixture of 2,6- and 2,7-dimethylnaphthalene at a temperature in the range of −20 to 71° C. said temperature being the lowest temperature determined from FIG. 1 at which the 2,6-/2,7-dimethylnaphthalene eutectic mixture is soluble in the liquids present.

References Cited

UNITED STATES PATENTS

| | | | |
|---|---|---|---|
| 1,836,211 | 12/1931 | Weiland et al. | 260—674 |
| 3,249,644 | 5/1966 | Hahn | 260—668 |
| 3,256,353 | 6/1966 | Shuman et al. | 260—667 |
| 3,285,984 | 11/1966 | Goble | 260—667 |
| 3,344,200 | 9/1967 | Wald et al. | 260—667 |
| 3,485,885 | 12/1969 | Peterkin et al. | 260—674 |

DELBERT E. GANTZ, Primary Examiner

C. E. SPRESSER Jr., Assistant Examiner

U.S. Cl. X.R.

760—667, 668F